United States Patent Office 3,475,537
Patented Oct. 28, 1969

3,475,537
STEROID ESTERS
Walter Morozowich, Kalamazoo, Mich., assignor to The Upjohn Company, Kalamazoo, Mich., a corporation of Delaware
No Drawing. Filed Apr. 22, 1966, Ser. No. 544,378
Int. Cl. A61k 17/06; C07c 167/28
U.S. Cl. 424—243                                10 Claims

ABSTRACT OF THE DISCLOSURE

A $\Delta^4$-3-ol steroid is reacted with a trialkylamine, $H_3PO_4$ and trichloacetontrile, and the method produces novel water-soluble $C_3$-phosphate esters of progestational steriods.

---

This invention relates to $C_3$-phosphate esters of progestational steroids, particularly the salt forms of those corresponding to the general formula appearing below. It relates further to methods for synthesizing such phosphate esters.

I have found that the phoshpate esters of $\Delta^4$-3-hydroxy steroids, particularly of those formulated below in their salt forms, as a class, are highly water soluble and form stable aqueous solutions and are thus chemically unique compared with poor organic esters of $\Delta^4$-3-hydroxy steroids. I have further found that phosphatase enzymes readily cleave representative 3-phosphate esters of compounds falling within the formula, below, to produce the free 3-hydroxy steriod compound. This stability in aqueous solution, yet ready cleavability by phosphatase enzymes, lend to the compounds particularly advantageous properties rendering them suitable for a variety of pharmacological uses.

An advantage of this invention is the provision of water-soluble forms of progestational agents for intravenous administration in the treatment of threatened abortion and other circumstances requiring rapid and substantial blood levels of the agents. No such agent is at present available, and many of the oral progestational agents which are available have low water solubility, and hence do not afford complete and uniform absorption.

The phosphate esters of $\Delta^4$-3-hydroxy steriods, the products of this invention, are the $C_3$-phosphate esters of the following structural formula:

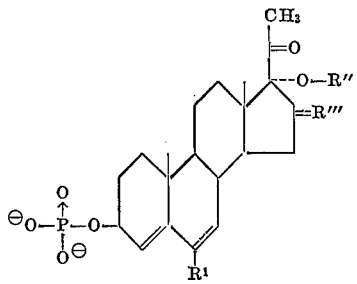

where:

R' =—$CH_3$,—$CH_2F$,—$CHF_2$,—$CF_3$,—X (X designates F, Cl).

R" =—$\overset{O}{\overset{\|}{C}}$—$CNH_2$ n+1 (n is 1 to 6).

R''' =H, H; H, $CH_3$, =$CH_2$; H, X (X designates F, Cl).

The phosphate esters of $\Delta^4$-3-hydroxy steroids of this invention are hydrolytically unstable in their free acid form, but exist and are useful in their various pharmacologically acceptable salt forms, as described below.

As a class, the above compounds find use, particularly in their salt form, in the treatment of mammals and other animals as progestational agents. They can be administered for the purpose and in the manner and dosage forms disclosed for 17α-acetoxy progesterone in U.S. Patent 2,965,541; and for the purpase and in the manner and dosage forms applied to progestational compounds generally, for both oral and parenteral use. Of the latter use, intramuscular or intravenous administration is preferable.

The chemical stability of the compounds of the above formula in aqueous solution combined with their ready cleavability of phosphatase enzymes render the compounds especially suitable for oral use, inasmuch as this combination of properties considerably enhances the biological availability of the progestationally active moiety of the ester molecule in the mammal digestive tract. This results from the presence of phosphatase enzymes in this biological environment. The presence of phosphatase enzymes in mammal tissue, in vivo, likewise enhances the availability of the progestational steriod moiety of the esters in parenteral uses.

These advantages extend to all human and veterinary uses, leading to improved absorption, more uniform biological response, reduced dosage, reduced side effects, and the like.

This invention also includes a chemical process for the preparation of $C_3$-phosphate esters of progestational steroids containing an allylic double bond such as the $\Delta^4$-double bond. The reaction in general is accomplished by causing a $\Delta^4$-3β-hydroxy compound, e.g., corresponding to the 3-oxy moiety of the above formula, to react in a medium comprising triethylamine, ortho phosphoric acid and trichloroacetonitrile. The reaction provides the desired $C_3$-phosphate ester in one reaction step.

Broadly, starting material used in the novei process of this invention is preferably a $\Delta^4$-3β-ol steriod compound which may possess any of the conventional non-interfering substituents found in compounds of the androstane and pregnane series and of the alkylated androstane and alkylated pregnane series, including those possessing double bonds in the nucleus, as are known in the art.

These starting materials can conveniently be prepared by reaction of the corresponding $\Delta^4$-3-one steriod with reducing agents such as lithium aluminum tri-butoxy hydride as disclosed in U.S. Patent 3,209,000.

The phosphorylation process according to this invention is conducted, as described above, by treating the $\Delta^4$-3β-ol with triethylamine, ortohphosphoric acid and trichloroacetonitrile to give the desired steriod $C_3$-phosphate ester in one step.

We can use any solvent inert to the reaction, or can employ an excess of trichloroacetonitrile as medium. Other solvents for the reaction may be used in which the steroid is soluble as well as bis-triehylammonium hydrogen phosphate. Examples of such solvents are acetonitrile, N, N-dimethylformamide, N,N-dimethylacetamide, ethyl acetate, dioxane, acetone and the like or mixtures thereof.

The molal ratio of the three constituents of the reaction mixture in which the novel process is conducted can vary over wide ranges so long as each consituent is present in substantially reacting amounts. It is well to avoid excesses of orthophosphoric acid in order to prevent the formation of steroid pyrophosphate esters as contaminants. It is likewise advisable to avoid excesses of triethylamine to prevent prolonged reaction times. The preferred molal ratio of orthophosphoric acid to steroid is about 1:1. The preferred molal ratio of triethylamine to orthophosphoric acid is about 1:1. The molal amount of trichloroacetonitrile is at least equal to that of the steroid.

The reaction is conducted in liquid phase and preferably at atmospheric pressure. Under these conditions the temperature is not critical, but reaction times may be prolonged with temperatures substantially below 20° C.

The preferred initial reaction temperature lies between 50° and 80° C. for the sake of technological convenience.

The time required for satisfactory reaction depends upon the chemico-thermodynamic characteristics of the reaction mixture as will be readily apprehended by those skilled in the art. It is preferable to select ratios of reactants and reaction temperatures so as to effect a completed reaction in less than four hours. The course of the reaction can be followed by any of the conventional means such as thin-layer chromatography or ion-exchange chromatography.

Separation of the desired $C_3$-phosphate ester from the reaction mixture is easily achieved by conversion to the cyclohexylamine salt or other water insoluble cyclic amine salt, and this salt can be purified by recrystallization from solvents such as hot acetone-water mixtures. The desired $C_3$-phosphate ester can also be recovered as the disodium salt by treatment with sodium hydroxide. Likewise the potassium, lithium, ammonium or other pharmacologically acceptable salts can be prepared using the corresponding hydroxide.

The following preparation describes the synthesis of the starting material corresponding to Formula I, or more broadly the $\Delta^4$-$3\beta$-ol steroid previously described. Other such materials can be prepared by applying the disclosure of U.S. Patent 3,209,000.

PREPARATION 1

38.8 g. of 6α-methyl-17α-acetoxy progesterone was dissolved in 450 ml. purified tetrahydrofuran cooled to 0° C. and mixed with a cold (0° C.) solution of 30.0 g. lithium aluminum tri-t-butoxyhydride dissolved in 150 ml. of purified tetrahydrofuran. Nitrogen atmosphere was used throughout. The solution was stirred at 0° C. for 30 minutes, then allowed to stand at room temperature for 1½ hours. The solution was poured into a separatory funnel containing a mixture of 125 ml. acetic acid, 600 g. chopped ice, and 400 ml. water. The mixture was extracted three times with 225-ml. portions of chloroform. The chloroform extracts were combined and washed with 300 ml. water containing 75 ml. concentrated ammonium hydroxide followed by six washes with 400 ml. water each. The chloroform extract was dried well with sodium sulfate and concentrated to a viscous liquid (~70 ml.) under vacuum. The residue was diluted with 30 ml. ether and within 10 minutes crystallization began. After three hours at room temperature, the crystalline mass was diluted with 50 ml. ether and the compound was isolated by filtration. After washing with ether and drying, the yield of crude 3β-hydroxy-17α-acetoxy-6α-methylpregn-4-en-20-one was 37.8 g. (97% theory). The compound was recrystallized from 100 ml. hot acetonitrile to give 27.9 g. of 3-dihydro-6α-methyl-17α-acetoxyprogesterone on cooling. An additional 4.1 g. was obtained on cooling the mother liquor to −15° C. Thin-layer chromatography showed one spot with a barely detectable contaminant of starting material M.P. 181–184° C.

Example 1.—3β-phosphato-17α-acetoxy-6α-methylpregn-4-en-20-one 5 g. of crystalline phosphoric acid was dissolved in 50 ml. acetonitrile containing 0.5 ml. water by heating to 60°. The solution was treated with 13.4 ml. triethylamine, 19.4 g. of 3β-hydroxy-17α-acetoxy-6α-methylpregn-4-en-20-one and 20 ml. of trichloroacetonitrile. The resulting yellow solution was maintained at room temperature for 4 hours. The solution was diluted with 225 ml. of water and extracted with four 100 ml. portions of ether. The aqueous layer was concentrated under vacuum at 25° to a volume of 75 ml. The yellow solution was treated with 5 ml. of cyclohexylamine and within a few minutes a crystalline deposit of the bis-cyclohexylammonium salt of 3β-phosphato-17α-acetoxy-6α-methylpregn-4-en-20-one occurred. The product was isolated by filtration, washed consecutively with water and acetone and dried under vacuum to give 8.7 g. product. The product was recrystallized from a hot 1:1 acetone-water mixture.

To prepare the disodium salt of 3β-phosphato-17α-acetoxy-6α-methylpregn-4-en - 20 - one, the following method was used. The biscyclohexylammonium salt was dissolved in water with the aid of an equimolar amount of sodium hydroxide. The liberated cyclohexylamine was removed by extraction with ether and the resulting colorless solution was freeze-dried to give disodium-3β-phosphato-17α-acetoxy-6α-methylpregn-4-en-20-one as a white powder.

*Analysis.*—Calcd. for $C_{24}H_{35}Na_2PO_7$: C, 56.25; H, 6.88; P, 6.04; Na, 8.97. Found: C, 55.76; H, 7.28; P, 5.99; Na, 8.68.

The purity of the compound is substantiated by the presence of one spot with $R_f$ 0.5 on silica gel G thin-layer-chromatography using the system isopropyl alcohol-water-ammonia (7:2:1). The spot is made visible by spraying with sulfuric acid and heating to 150° C.

Example 2.—Bis-cyclohexylammonium - 3β - phosphato-17α-caproyloxy - 6α - methylpregn-4-en-20- one and the corresponding disodium salts Substituting in Preparation 1, as the starting material 17α-caproyloxy-6α-methyl progesterone, there is produced 3β-hydroxy-17α-caproyloxy-6α-methylpregn - 4 - en-20-one. This compound when substituted in the procedure of Example 1, is productive of biscyclohexylammonium-3β-phosphato-17α-caproyloxy-6α-methylpregn - 4 - en-20-one, which is converted to the corresponding disodium salt, disodium - 3β-phosphato-17α-caproyloxy-6α-methylpregn-4-en-20-one, by the procedure of the last paragraph of Example 1.

Example 3.—Bis-cyclohexylammonium - 3β - phosphato-17α-acetoxypregn-4-en-20-one and the corresponding disodium salts Substituting in Preparation 1, as the starting material 17α-acetoxyprogesterone, there is produced 3β-hydroxy-17α-acetoxy-pregn-4-en-20-one. This compound when substituted in the procedure of Example 1 is productive of bis-cyclohexylammonium-3β-phosphato - 17α - acetoxy-pregn-4-en-20-one, which is converted to the corresponding disodium salt, disodium-3β-phosphato-17α-acetoxy-pregn-4-en-20-one, by the procedure of the last paragraph of Example 1.

Example 4.—Bis-cyclohexylammonium - 3β - phosphato-17α - acetoxy - 6 - methylpregna - 4,6 - diene - 20 - one and the corresponding disodium salts Substituting in Preparation 1, as the starting material 17α-acetoxy-6-methylpregna-4,6-dien-3,20-dione, there is produced 3β - hydroxy - 17α - acetoxy - 6 - methyl-pregna - 4,6 - diene - 20 - one. This compound, when substituted in the procedure of Example 1, is productive of bis - cyclohexylammonium - 3β - phosphato - 17α-acetoxy - 6 - methylpregna - 4,6 - diene - 20 - one, which is converted to the corresponding disodium salt, disodium - 3β - phosphato - 17α - acetoxy - 6 - methylpregna-4,6-diene - 3,20 - dione, by the procedure of the last paragraph of Example 1.

Example 5.—Bis - cyclohexylammonium - 3β - phosphato - 17α - acetoxy - 6 - methyl - 16 - methylene-pregna - 4,6 - diene - 20 - one and the corresponding disodium salts Substituting in Preparation 1, as the starting material 17α - acetoxy - 6 - methyl - 16 - methylene - pregna-4,6 - diene - 3,20 - dione, there is produced 3β - hydroxy-17α - acetoxy - 6 - methyl - 16 - methylene - pregna-4,6 - diene - 20 - one. This compound, when substituted in the procedure of Example 1 is productive of bis-cyclohexylammonium - 3β - phosphato - 17α - acetoxy - 6-methyl - 16 - methylene - pregna - 4,6 - diene - 20 -one, which is converted to the corresponding disodium salt, disodium - 3β - phosphato - 17α - acetoxy - 6 - methyl- 16 - methylene - pregna - 4, 6 -diene - 20 - one, by the procedure of the last paragraph of Example 1.

Example 6.—Bis - cyclohexylammonium - 3β - phosphato - 17α - acetoxy - 6 - chloro - pregna - 4,6 - diene-20-one and the corresponding disodium salts Substituting in Preparation 1, as the starting material 17α - acetoxy - 6 - chloro - pregna - 4,6 - diene - 3,20-dione, there is produced 3β - hydroxy - 17α - acetoxy-6-chloro - pregna - 4,6 - diene - 20 - one. This compound, when substituted in the procedure of Example 1 is productive of bis - cyclohexylammonium - 3β - phosphato-17α - acetoxy - 6 - chloro - pregna - 4,6 - diene - 20 - one, which is converted to the corresponding disodium salt, disodium - 3β - phosphato - 17α - acetoxy - 6 - chloro-pregna - 4,6 - diene - 20 - one, by the procedure of the last paragraph of Example 1.

As previously described the compounds of this invention in the form of their cyclic ammonium salts or alkali metal salts find use in the treatment of humans and other mammals and animals as progestational gents. Their unique advantages of improved biological response permits under many circumstances reduced side effects; and generally provides for an improved biochemical control of the individual under treatment. The following formulations are representative, and variations in quantities, proportions, concentrations, and size of dosage form can be varied according to the circumstances as well occur readily to those skilled in the art.

TABLE I

Tablet suitable for oral use

Ingredients: Mg.
  Spray dried lactose _____ 105
  Starch _____ 5
  Calcium stearate _____ 0.6
  Talc, bolted _____ 3
  Disodium 3β - phosphato - 17α - acetoxy - 6α-methylpregn - 4 - en - 20 - one _____ 10
  Lactose, hydrous, U.S.P., bolted _____ 10

TABLE II

Sterile solutions suitable for parenteral use

Ingredients—each ml. contains:
  Disodium - 3β - phosphato - 17α - acetoxy - 6α-methylpregn - 4 - en - 20 - one _____mg__ 50
  Sodium citrate _____mg__ 5
  Benzyl alcohol _____mg__ 9
  Sodium chloride q.s. to isotonicity.
  Hydrochloric acid q.s. to pH 7.5.
  Water for injection q.s. _____ml__ 1

In the foregoing formulations, the dosage can vary from 0.2 to 10 mg. of the $C_3$-phosphate ester material per kilo of body weight of the individual under treatment. The dosage may be repeated, at a frequency and for a duration that can readily be determined by the skilled physician or veterinarian.

Oral dosages such as, for example, the tablet of Table I or capsules and lozenges or the like, can contain from about 2 to about 100 mg. of the $C_3$-phosphate ester of this invention. Suitable treatments with such dosage forms of this invention and within the purview of this invention include the use of fractional or multiple forms. Scored tablets are useful for fractional dosages.

Solutions suitable for injection such as, for example, that shown in Table II can contain from about 2 to about 200 mg. per ml. of the $C_3$-phosphate ester of this invention. Suitable treatments with such solutions, and within the purview of this invention, include, of course, the administration of suitable quantities of the solution at a frequency and for the duration that can be readily determined by the skilled physician or veterinarian.

I claim:
1. The $C_3$-phosphate esters of the following formula:

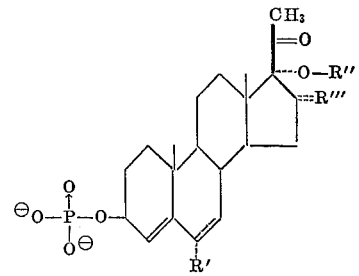

where

R' =—$CH_3$,—$CH_2F$,—$CHF_2$,—$CF_3$,—X (X designates F, Cl);

R" =—$\overset{O}{\overset{\|}{C}}$—$C_nH_{2n+1}$ (n may be 1 to 6).

R'''=—H, H; H, $CH_3$, =$CH_2$; H, X (X designates F, Cl).

and salts thereof.

2. A compound of claim 1 wherein R' is methyl, R" is acetyl and R''' is H,H.

3. A compound according to claim 1 in which R' is methyl, R" is acetyl and R''' is =$CH_2$.

4. A compound of claim 1 in which R' is F, R" is acetyl and R''' is H,H.

5. A process which comprises treating a steroid $\Delta^4$-3β-ol of the androstane series, pregnane series, alkylated androsttane series and alkylated pregnane series with a trialkylamine, $H_3PO_4$ and trichloroacetonitrile to produce the corresponding $\Delta^4$-3-phosphate.

6. A process of claim 5 wherein the $\Delta^4$-3-phosphate ester product is recovered from the reaction mixture by crystallization as its salt with a cyclic amine.

7. A process of claim 6 in which the cyclic amine salt of the steroid phosphate ester is converted to the corresponding sodium salt by reaction with sodium hydroxide.

8. An oral composition in dosage unit form for modifying the fertility period in animals comprising from about 2 to about 200 mg. per dosage unit of a salt of a compound of the formula of claim 1.

9. A sterile aqueous solution suitable for injection comprising from about 5 to about 200 mg. per ml. of a salt of a compound of the formula of claim 1.

10. A method for effecting the control of the fertility period in an animal which comprises administering a dose of from about 0.2 to about 10 mg. per kilo of body weight of said animal of a salt of a compound of the formula of claim 1.

References Cited

UNITED STATES PATENTS 2,928,849   3/1960   Dicsfalusy et al. ___ 260—397.5

FOREIGN PATENTS 6,404,873   11/1964   Netherlands.

OTHER REFERENCES

Cocker et al., "Journ. Med. Chemistry," July 1965, pp. 417–419 relied on.

ELBERT L. ROBERTS, Primary Examiner

U.S. Cl. X.R.

260—397.4

PO-1050
(5/69)

UNITED STATES PATENT OFFICE
CERTIFICATE OF CORRECTION

Patent No. 3,475,537      Dated October 28, 1969

Inventor(s) Walter Morozowich

It is certified that error appears in the above-identified patent and that said Letters Patent are hereby corrected as shown below:

Column 1, line 55, patent reads " " should read -- | --.

Column 1, line 63, patent reads "R" = $-\overset{O}{\underset{\|}{C}}-CNH_2n+1$" should read -- R" = $-\overset{O}{\underset{\|}{C}}-C_nH_{2n+1}$ --.

Column 2, line 9, patent reads "of" should read -- by --.

Column 2, line 52, patent reads "triehylammonium" should read -- triethylammonium --.

Column 5, line 21, patent reads "gents" should read -- agents --.

Column 6, line 32, patent reads "androsttane" should read -- androstane --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents